United States Patent
Camp, Jr. et al.

(10) Patent No.: US 7,697,917 B2
(45) Date of Patent: Apr. 13, 2010

(54) METHOD FOR SAFE OPERATION OF MOBILE PHONE IN A CAR ENVIRONMENT

(75) Inventors: William O. Camp, Jr., Chapel Hill, NC (US); L. Scott Bloebaum, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 803 days.

(21) Appl. No.: 11/468,336

(22) Filed: Aug. 30, 2006

(65) Prior Publication Data

US 2008/0064446 A1 Mar. 13, 2008

(51) Int. Cl.
*H05K 11/02* (2006.01)
(52) U.S. Cl. .............. 455/345; 455/26.1; 455/67.11; 701/1; 701/2; 701/3; 701/4; 701/5; 70/6; 70/7; 70/8
(58) Field of Classification Search .......... 455/345, 455/26.2, 67.1; 701/1–8
See application file for complete search history.

(56) References Cited

U.S. PATENT DOCUMENTS

| 6,108,532 | A | 8/2000 | Matsuda et al. | |
|---|---|---|---|---|
| 6,263,190 | B1 * | 7/2001 | Mamori et al. | 455/67.11 |
| 6,311,078 | B1 | 10/2001 | Hardouin | |
| 6,353,778 | B1 * | 3/2002 | Brown | 701/1 |
| 6,640,115 | B1 | 10/2003 | Fujimoto et al. | |
| 7,065,349 | B2 | 6/2006 | Nath et al. | |
| 2001/0006886 | A1 * | 7/2001 | Suzuki | 455/63 |
| 2003/0144014 | A1 * | 7/2003 | Kumhyr | 455/465 |
| 2004/0142658 | A1 * | 7/2004 | McKenna et al. | 455/11.1 |
| 2007/0072553 | A1 * | 3/2007 | Barbera | 455/67.11 |
| 2008/0054072 | A1 * | 3/2008 | Katragadda et al. | 235/384 |
| 2008/0085691 | A1 * | 4/2008 | Harvey et al. | 455/187.1 |

FOREIGN PATENT DOCUMENTS

| JP | 10-224843 | 8/1998 |
|---|---|---|
| JP | 10-327464 | 12/1998 |
| JP | 2000-209656 | 7/2000 |

OTHER PUBLICATIONS

Written Opinion for International Application No. PCT/U507/04891 dated Jan. 16, 2008.

* cited by examiner

*Primary Examiner*—Vincent P Harper
*Assistant Examiner*—Michael Irace
(74) *Attorney, Agent, or Firm*—Renner, Otto, Boisselle & Sklar, LLP

(57) ABSTRACT

A method of operating electronic equipment, wherein said electronic equipment utilizes a wireless signal to communicate, includes determining if the electronic equipment is operated within a moving vehicle based on a characteristic of the wireless signal and inhibiting operation of the electronic equipment if the electronic equipment is in a moving vehicle.

15 Claims, 5 Drawing Sheets

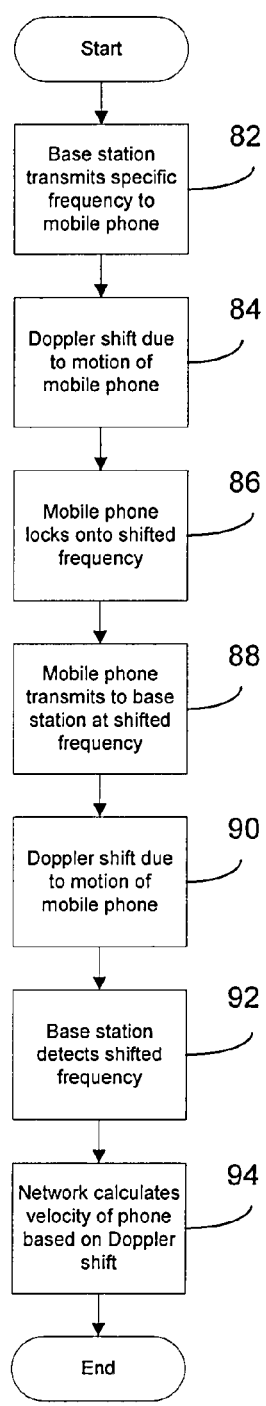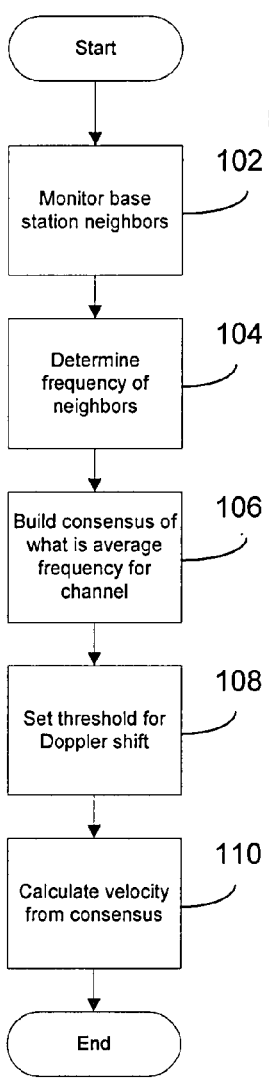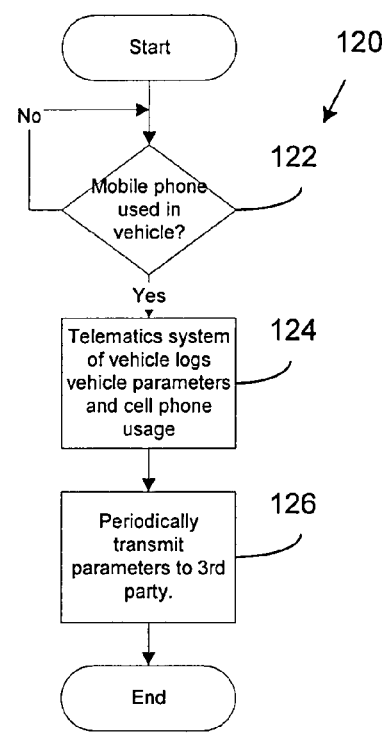
FIG. 6A
FIG. 6B
FIG. 7

METHOD FOR SAFE OPERATION OF MOBILE PHONE IN A CAR ENVIRONMENT

TECHNICAL FIELD OF THE INVENTION

The present invention relates generally to electronic equipment and, more particularly, to a system, apparatus and method for safely operating a mobile communication device in a vehicle.

DESCRIPTION OF THE RELATED ART

Mobile communication devices such as, for example, mobile phones, PDA's, mobile computers, or the like, have become prevalent in business, personal, and other applications. While mobile communications devices provide numerous benefits to society, there are some drawbacks. In particular, simultaneous operation of a mobile communications device and a motor vehicle requires the user to devote part of his/her attention to operating the vehicle and part of his/her attention to using the mobile communications device.

Some have argued that hands free kits solve the problems associated with use of mobile communication devices while operating a vehicle. The particular thrust of this argument is that the hands free kit allows the vehicle operator to use both hands for driving the vehicle. However, the act of communicating, whether via a mobile communications device or face-to-face, requires a certain level of concentration by the communicator. When such communication is performed by an operator of a vehicle, his full attention may not be directed to the main task at hand, which is driving the vehicle.

SUMMARY

The present invention enables a mobile communication device, such as a mobile phone or the like, to be automatically disabled when used in a moving vehicle. Alternatively, use in a moving vehicle may be permitted, but the user may be charged a premium, thereby discouraging such use. Further, exceptions may be made to allow use of the mobile phone in mass transit settings, such as on public transportation, and/or for passengers in an automobile.

According to one aspect of the invention, there is provided a method of operating electronic equipment, wherein said electronic equipment utilizes a wireless signal to communicate. The method includes determining if the electronic equipment is operated within a moving vehicle based on a characteristic of the wireless signal; and inhibiting operation of the electronic equipment if the electronic equipment is in a moving vehicle.

According to another aspect of the invention, the characteristic of the wireless signal can be a timing advance or a Doppler shift of the wireless signal.

According to another aspect of the invention, a determination can be made whether a user of the electronic equipment is an operator or a non-operator of the moving vehicle.

According to another aspect of the invention, inhibiting can include inhibiting operation of the electronic equipment if said user is an operator of the moving vehicle.

According to another aspect of the invention, determining if a user of the electronic equipment is an operator or a non-operator can include using a near field device located at non-operator seating locations to enable operation of the electronic equipment while the vehicle is moving.

According to another aspect of the invention, inhibiting operation of the electronic equipment can be overridden by user operation of at least one user signal device at a periodic time interval.

According to another aspect of the invention, the user signal device can be at least one of a keypad of the electronic equipment or at least one button located near non-operator seating locations.

According to another aspect of the invention, operation of the user signal device can be in response to a prompt generated in on or in the electronic equipment.

According to another aspect of the invention, the prompt can include a code periodically displayed on a display device of the electronic equipment, and operation of the user signal device comprises re-entry of the code on a keypad of the electronic equipment.

According to another aspect of the invention, determining if the user of the electronic equipment is an operator or a non-operator can include determining that the user is a non-operator if the characteristic of the wireless signal is indicative of the vehicle is moving at a speed greater than a predetermined speed.

According to another aspect of the invention, the method can further include detecting Doppler shifts for a plurality of electronic equipment within a predefined area; and determining that said user is a non-operator of the moving vehicle when a plurality of electronic equipment in the same predefined area have substantially the same Doppler shift.

According to another aspect of the invention, all emergency communications can be enabled.

According to another aspect of the invention, the method can further include implementing a differential charge for use of the electronic equipment, said differential charge including a first rate and a second rate greater than the first rate, and wherein inhibiting operation includes allowing use of the electronic equipment only at the second rate if said user is an operator of the moving vehicle.

According to another aspect of the invention, determining if the electronic equipment is operated in a moving vehicle can include using the electronic equipment to determine the Doppler shift in the wireless signal and to inhibit operation of the electronic equipment.

According to another aspect of the invention, determining if the electronic equipment is operated in a moving vehicle can include using a wireless network to determine the Doppler shift in the wireless signal and to inhibit operation of the electronic equipment.

According to another aspect of the invention, the electronic equipment is a mobile phone.

According to another aspect of the invention, there is provided a method of providing information relating to electronic equipment usage in a vehicle to a third-party. The method can include monitoring electronic equipment usage parameters in the vehicle; and transmitting the parameters to the third party.

According to another aspect of the invention, the third-party and the user can have a contractual relationship.

According to another aspect of the invention, the contractual relationship can be between an owner of the vehicle and an insurance entity, and rates paid by the owner to the insurance entity are based at least in part on the usage parameters.

According to another aspect of the invention, monitoring can include using a receiver within the vehicle to monitor localized energy levels indicative of electronic equipment use in the vehicle.

According to another aspect of the invention, there is provided an electronic equipment, including: a motion circuit operable to determine a velocity of the electronic equipment based on a characteristic of a wireless signal used by the electronic equipment; and a control circuit configured to interrupt operation of the electronic equipment when said velocity corresponds to operation of the mobile phone in a moving vehicle.

According to another aspect of the invention, the characteristic of the wireless signal can be a timing advance or a Doppler shift of the wireless signal.

According to another aspect of the invention, there is provided a computer program embodied on a computer readable medium and operable in electronic equipment that utilizes a wireless signal, including: code that determines if the electronic equipment is operated within a moving vehicle based on a characteristic of the wireless signal; and code that inhibits operation of the electronic equipment if the electronic equipment is in a moving vehicle.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIGS. 6A-6B are flow charts illustrating exemplary steps for determining a velocity of a mobile phone based on a characteristic of a signal used by the mobile phone in accordance with the invention.

FIG. 7 is a flow chart illustrating exemplary steps for monitoring mobile phone activity within a vehicle in accordance with the invention.

DETAILED DESCRIPTION OF EMBODIMENTS

Figure 1:
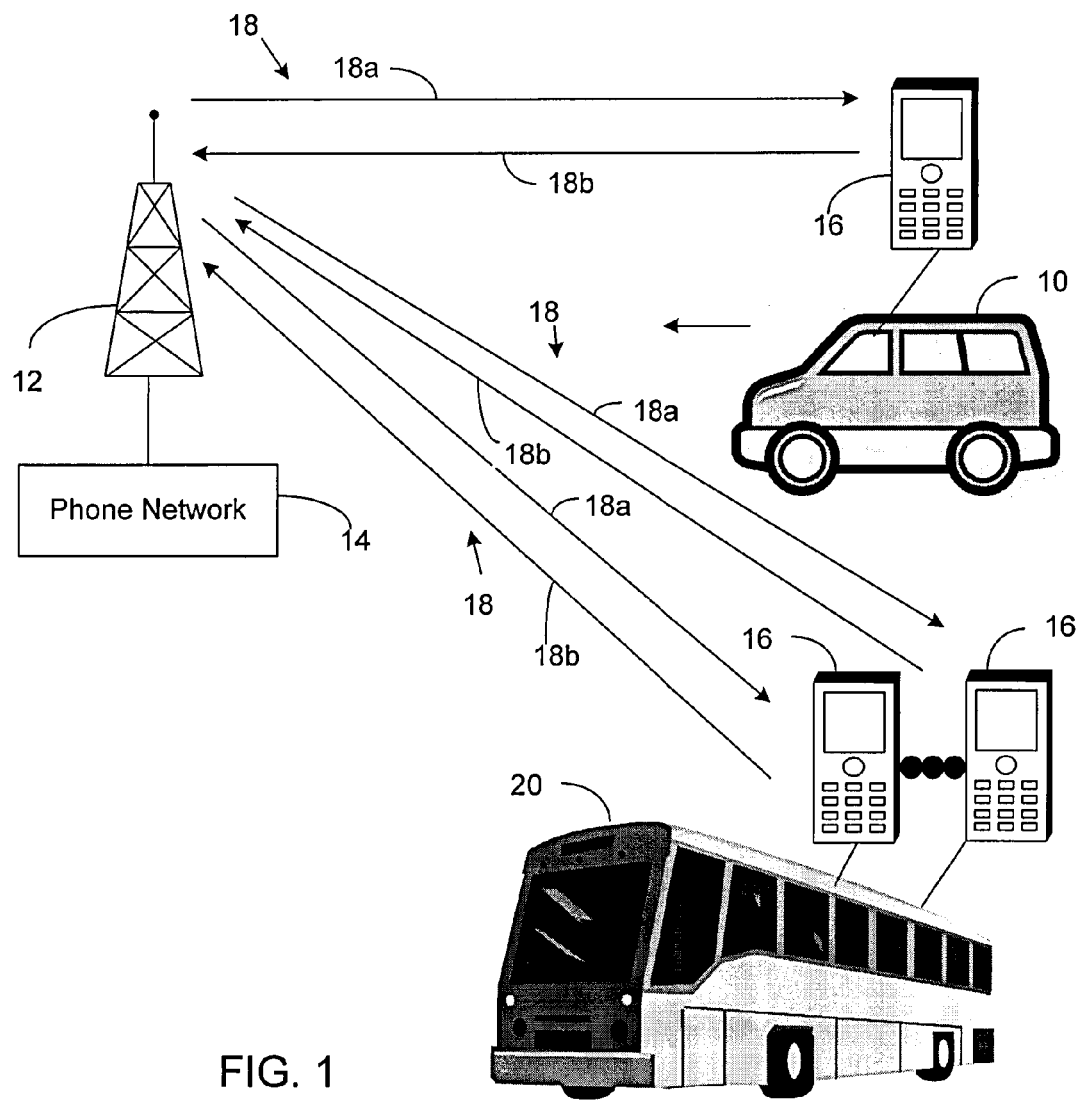
FIG. 1 is a schematic diagram illustrating use of a mobile phone in a moving vehicle.

The present invention will now be described with reference to the drawings, wherein like reference numerals are used to refer to like elements throughout.

The term "electronic equipment" includes portable radio communication equipment. The term "portable radio communication equipment," which herein after is referred to as a "mobile radio terminal," "mobile phone," "mobile device," or "mobile terminal", and the like, includes all equipment such as mobile telephones, pagers, communicators, i.e., electronic organizers, personal digital assistants (PDAs), smartphones, portable communication apparatus or the like.

In the present application, the invention is described primarily in the context of a mobile phone. However, it will be appreciated that the invention is not intended to be limited to a mobile phone and can be any type of electronic equipment. As will be appreciated, the invention is applicable to both portable devices (e.g., hand held mobile phones) and non-portable devices (e.g., devices integrated within the vehicle, such as an integrated telematics system). As used herein, a telematics system refers to a mobile phone system integrated within the vehicle. With the exception of the portability and some functional differences, the telematics system of a vehicle performs many of the functions of a conventional hand-held mobile phone.

According to one aspect of the present invention, operation of electronic equipment, such as a mobile phone or the like, within a moving vehicle is detected based on a characteristic of a signal used by the electronic equipment. The characteristic may be, for example, a Doppler shift detected in the signal. Alternatively, the characteristic may be based on a location of the transmitting and/or receiving signal. As will be appreciated, other characteristics of the signal may be utilized to determine if the electronic equipment is in a moving vehicle.

If operation of the electronic equipment is determined to be within a moving vehicle and an emergency condition is not detected, then operation of the electronic equipment may be inhibited. Further, a determination can be made whether the user of the electronic equipment is an operator of the vehicle or a non-operator of the vehicle. If the user is an operator, then the electronic equipment may be inhibited, while if the user is a non-operator, the electronic equipment may not be inhibited. Alternatively, the operator of the vehicle may be given the option of paying a premium rate for using the mobile phone 16 while operating the vehicle, in which case the mobile phone may remain in the operative state.

Referring now to FIG. 1, a vehicle 10 (e.g., a car, van, or the like) is shown moving in a direction toward a base station 12, such as a communication tower 12. The tower 12 is coupled to a mobile communication network 14, such as a mobile phone network, for example, as is conventional. Within the vehicle 10 is an electronic equipment 16, such as a mobile phone 16 or the like, wherein the mobile phone 16 is communicating over the network 14 via a signal 18. The signal 18 includes a first signal component 18a transmitted from the tower 12 and received by the mobile phone 16, and a second signal component 18b transmitted by the mobile phone 16 and received by the tower 12.

The signal 18a transmitted by the tower 12 is at a predetermined frequency, and the signal 18b transmitted by the mobile phone 16 also is at a predetermined frequency. As described in more detail below, based on a Doppler shift of the two signals 18a and 18b, a velocity of the mobile phone 16 can be determined. Once the velocity of the mobile phone 16 has been determined or otherwise calculated, the velocity can be compared to a preset velocity (e.g., a velocity greater than average walking or running velocity of a human, or some other preset velocity). If the calculated velocity is greater than the preset velocity, then it can be concluded that the mobile phone 16 is being operated in a vehicle, and operation of the mobile phone can be inhibited. For example, the network 14 and/or the mobile phone 16 may interrupt service (e.g., terminate the call and/or prevent incoming calls). Prior to interruption of service, the user may be given a warning or grace period in which he may normally terminate the call or stop the vehicle prior to the network 14 and/or phone 16 intervening.

As will be appreciated, there may be instances when the mobile phone 16 is being operated in a vehicle by a non-operator of the vehicle (e.g., a passenger). For example, the user of the mobile phone 16 may be a passenger of the vehicle (e.g., a second occupant in the vehicle 10, or a passenger in a public transportation vehicle, such as a bus 20 or other mass transit vehicle). In such circumstances, it is preferable that the mobile phone 16 be functional for non-operators (e.g., passengers) of the respective vehicles.

Figure 2:
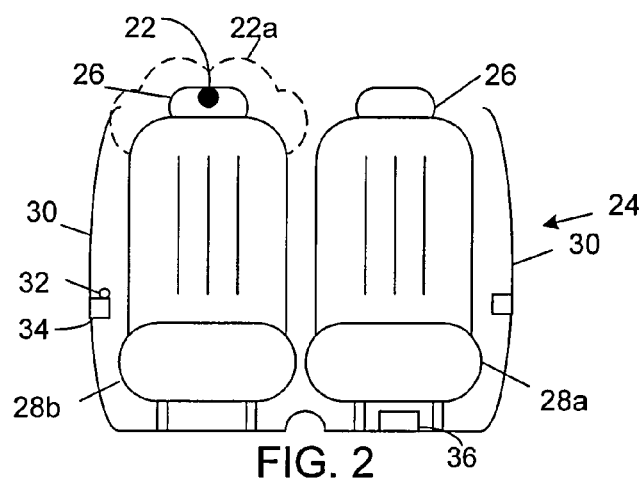
FIG. 2 is a schematic diagram illustrating an exemplary seating area of a vehicle in accordance with the invention.

Passengers in the vehicle 10 can be identified in a number of different ways. For example, and with further reference to FIG. 2, a near field communications (NFC) sensor 22 may located in one or more seating areas 24 of the vehicle (e.g., one for each non-operator seat). The NFC sensor 22 may be located in a head rest 26 of a non-operator seat 28b, within the seat itself, or in close proximity to the seat 28b, e.g., in the door panel 30. If the mobile phone 16 and/or the vehicle are moving, operation of the mobile phone 16 may be allowed only if it is within range of the NFC sensor 22. Additionally, the NFC sensor 22 may communicate with and/or be under the control of a telematics system 36 of the vehicle 10, such that the telematics system 36, the phone 16 and/or network 14 inhibit communications when the vehicle is determined to be moving and the phone 16 is not within range of the NFC sensor 22

Alternatively, if the mobile phone 16 is detected in a moving vehicle 10, operation of the mobile phone 16 may be allowed if the user periodically presses a signal device, such as a button 32 or the like, mounted near non-operator seating locations. For example, a button 32 may be located on the door panel 30 or in an arm rest 34 of a non-operator seating location, wherein the button 32 is coupled to the telematics system 36 of the vehicle 10. To allow operation of the mobile phone 16 in the moving vehicle 10, the user periodically presses the button 32. Since the button 32 is only accessible from a non-operator seating location, the telematics system 36 knows the user is not operating the vehicle 10 and therefore does not interfere with the mobile phone's operations. Instead of a periodically pressing the button 32, the user may be required to hold the button 32 for the duration of the call. As will be appreciated, other scenarios may be implemented, such as using multiple buttons (pressing multiple buttons simultaneously or in sequence), for example. Further, in the case where the vehicle includes a telematics system 36 and a separate hand-held mobile phone is used within the vehicle, the telematics system 36 may communicate with the hand-held mobile phone (e.g., via Bluetooth or the like) so as to enable/disable the mobile phone based on signals received by the telematics system 36 via the button 32.

In another embodiment, the mobile phone 16, if detected in a moving vehicle 10, may periodically display a code on its display device. The user then would have a predetermined amount of time to enter the code back into the mobile phone 16 (e.g., via the phones key pad or the like). Failure to enter the code in the allotted time would place the mobile phone 16 in an inoperable state (e.g., terminate and/or prevent communications).

Allowing mobile phone operation in mass or public transportation vehicles, such as a bus, street car, train, or the like, is preferable, since such use is not a safety concern as the users are not operating the vehicle. As will be appreciated, there may be a number of mobile phones in use on a mass transit vehicle at any given time. By identifying a number of mobile phones experiencing the same Doppler shift, such phones can be said to be on the same vehicle, such as a mass transit vehicle and, therefore, operation of the mobile phone may be allowed.

Figure 3:
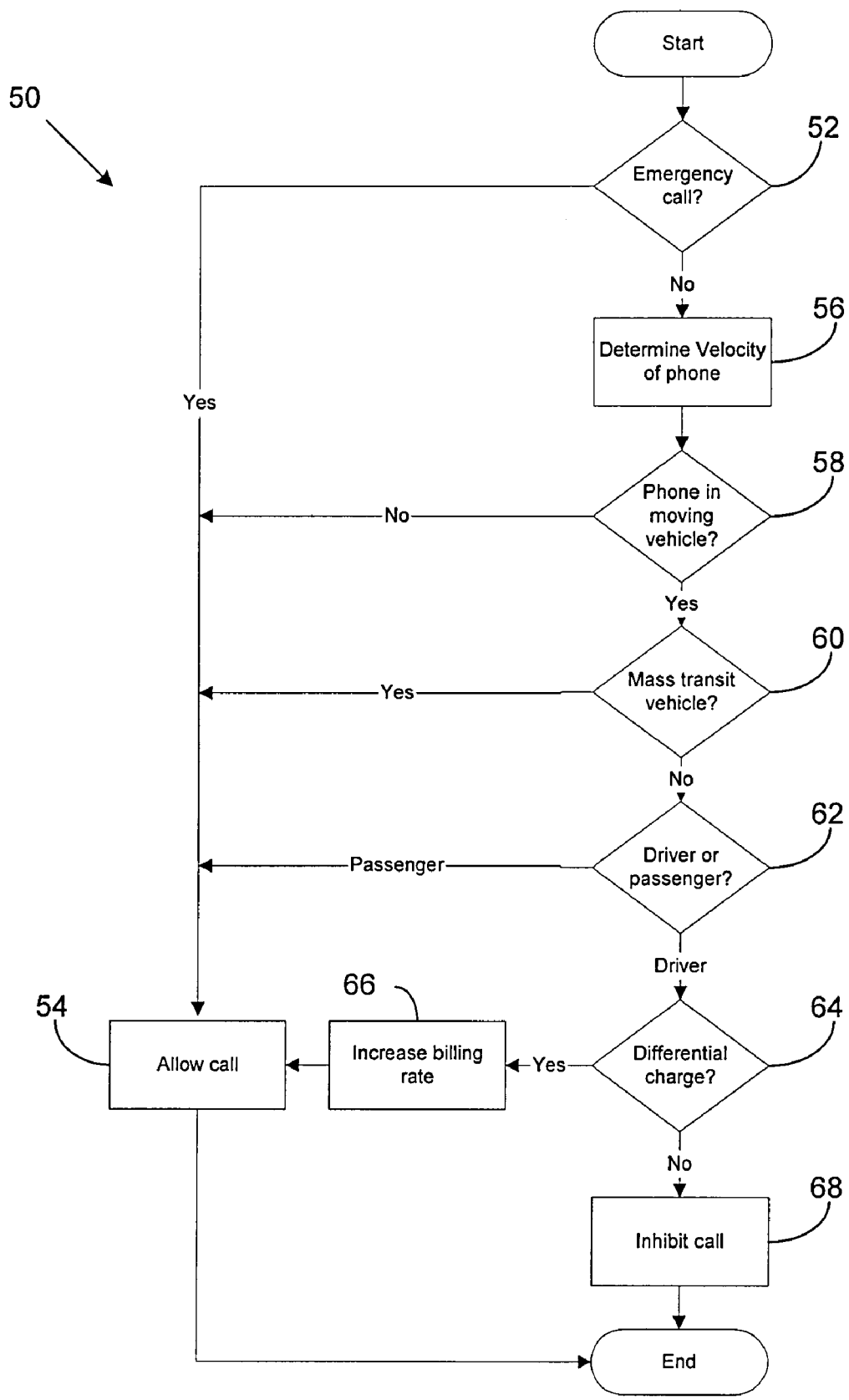
FIG. 3 is a flow chart illustrating exemplary steps for carrying out a method of operating a mobile phone in a vehicle in accordance with the invention.

Moving now to FIG. 3, a flow chart 50 is shown illustrating exemplary steps for safely operating electronic equipment in a moving vehicle. The flow charts described herein include a number of process blocks arranged in a particular order. As should be appreciated, many alternatives and equivalents to the illustrated steps may exist and such alternatives and equivalents are intended to fall within the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

Beginning at block 52, it is determined if the communication is an emergency communication or a normal communication. Emergency communications can include, for example, calls to the police department, fire department, medical services, or the like. Such communications may be identified, for example, by the number dialed by the user. More specifically, emergency numbers, such as 911 or other emergency numbers, can be stored in memory of the mobile phone 10 and/or network 14. If a number is dialed that matches an identified emergency number, then at block 54 the mobile phone 16 is placed in the operative state and the communication is allowed. However, if the communication is not an emergency communication, then at block 56 the velocity of the mobile phone is determined.

The velocity of the mobile phone 16 can be determined based on a characteristic of a signal 18 used by the mobile phone 16. For example, the Doppler shift of the signal 18 can be determined using conventional techniques and, based on the Doppler shift, the velocity of the phone can be calculated. Alternatively, as the mobile phone 16 moves through an area, it continuously scans neighboring towers 12 for better signal quality. Contact with each neighboring tower 12 can be logged by the network 14 and/or the mobile phone 16, and then analyzed so as to determine an approximate velocity of the mobile phone 16. Further details for determining a velocity of the mobile phone are discussed with respect to FIGS. 6A and 6B below.

Moving to block 58, the velocity of the mobile phone 16 is analyzed to determine if the mobile phone 16 is in a moving vehicle. This may be accomplished, for example, by comparing the velocity of the mobile phone 16 relative to a preset value. If the mobile phone 16 is not moving (e.g., zero velocity) or is moving but at some value less than the preset speed, then it can be concluded that the mobile phone 16 is not in a moving vehicle and the communication is allowed, as indicated at block 54. However, if the velocity is greater than the preset value, then at block 60 a determination is made whether the vehicle is a mass transit vehicle or a standard passenger car.

Figure 4:
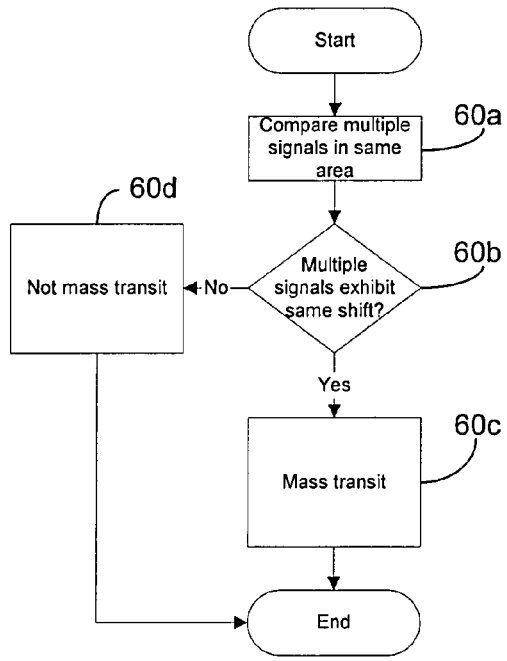
FIG. 4 is a flow chart illustrating exemplary steps for determining if a mobile phone is operated in a mass transit vehicle in accordance with the invention.

Use of a mobile phone 16 on a mass transit vehicle can be determined, for example, by the presence of multiple signals 18 in the same area experiencing the same Doppler shift, by a velocity of the vehicle (e.g., a velocity above a preset threshold) or by a location of the signal 18 (e.g., in a known mass transit corridor. For example, and with further reference to FIG. 4, signals originating in the same general area (e.g., via the same tower 12) can be compared to each other, as indicated at block 60a. At block 60b, it is determined if multiple signals (e.g., two, three, four or more) exhibit substantially the same Doppler shift within the same area (e.g., within the same cell). If such signals exhibit the same Doppler shift, then at block 60c the respective mobile phones 16 using the signals 18 are said to be on a mass transit vehicle. However, if the signals exhibit different Doppler shifts, then at block 60d it is concluded that the signals are not originating from a mass transit vehicle.

Instead of checking for a number of signals exhibiting the same Doppler shift in the same general area, use of a mobile phone 16 on a mass transit vehicle may be determined in other ways. For example, certain mass transit vehicles, such as trains, may travel at substantially higher speeds than automobiles. To detect use of a mobile phone 16 on a train, a threshold velocity can be set that is higher than typical automobile speeds. If the speed of the mobile phone 16 exceeds this threshold velocity, then it can be concluded that the mobile phone 16 is being operated on a mass transit vehicle.

Yet another way of determining use of the mobile phone 16 on a mass transit vehicle is based on a location of the mobile phone 16. More particularly, mass transit vehicles may be routed through corridors that are not accessible by automobiles. By detecting use of the mobile phone 16 in such corridors (e.g., based on a GPS determined position of the mobile phone or based on the tower 12 servicing the mobile phone), it can be concluded that the mobile phone 16 is being used in a mass transit corridor, and thus on a mass transit vehicle.

Referring back to FIG. 3, if the vehicle 10 is determined to be a mass transit vehicle, then the method moves to block 54 and communication is allowed. However, if the vehicle 10 is determined to not be a mass transit vehicle, then at block 62 it is determined if the user of the mobile phone 16 is a driver or passenger of the vehicle 10.

Figure 5A:
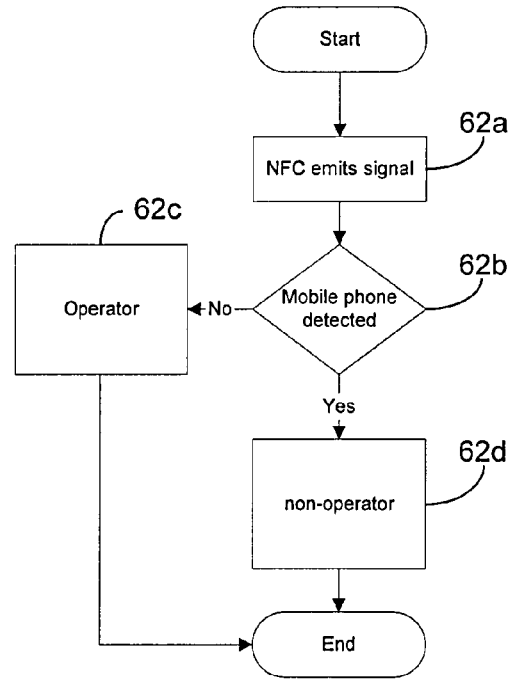
FIGS. 5A-5B are flow charts illustrating exemplary steps for determining if a mobile phone user is an operator of a vehicle in accordance with the invention.

Determination of whether the user is a driver (operator) or passenger (non-operator) can be accomplished via the aforementioned NFC sensor 22. Since the NFC sensor is only in non-operator seating locations, an operator cannot simultaneously operate the vehicle and place the phone in a non-operator locations. For example, and with further reference to FIG. 5A, communications may be enabled only when the mobile phone 16 is within range of the NFC sensor 22. As shown at block 62a, the NFC emits and/or scans for a signal to/from the mobile phone 16. If the mobile phone is not detected (i.e., it is not in range of the NFC), then at block 62c the user is said to be in operator, as indicated at block 62c. If the mobile phone 16 is detected, then at block 62d the user is said to be a non-operator.

Alternatively or in addition to, the NFC sensor 22 can be coupled to the telematics system 36 and/or the network 14 (or other WAN) such that coded messages may be transmitted to the NFC sensors and/or the mobile phone 16, and then back to the network 14. If these codes do not match in relatively close time alignment, the phone may not be activated.

Figure 5B:
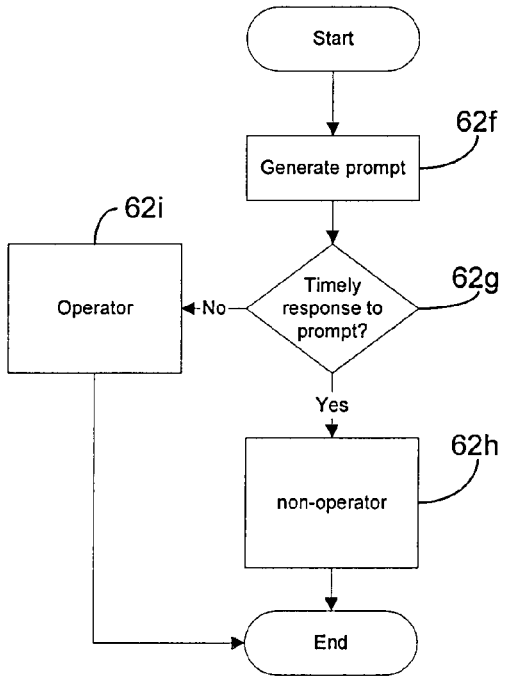

Another way in which a determination can be made regarding the user's status within the vehicle is shown in FIG. 5B. Beginning at block 62f, a prompt is generated on the mobile phone's display when the phone's velocity is greater than a preset value. The prompt may be a request to enter a code as provided on the display. At block 62g, it is determined if a response to the prompt was timely made (e.g., was the response entered within a predetermined amount of time). If the response was entered within the allotted time, then at block 62h the user is considered to be a non-operator of the vehicle (a passenger). However, if the response was not entered within the allotted time, then at block 62i the user is consider an operator of the vehicle (a driver).

A variation of the method of FIG. 5B can include using a signaling device accessible only in non-operator seating areas. For example, instead of entering a code into the mobile phone 16 via a keypad, a user signaling device, such as one or more buttons 32, can be coupled to a telematics system 36 of the vehicle 10. When the mobile phone is in use, the user may periodically or continuously operate the one or more signaling devices (e.g., continuously hold the one or more buttons 32 or operate the buttons 32 in a predetermined sequence). The telematics system 36 then can provide this information to the network 14 and/or to the phone 16 so as to determine if the user is an operator or non-operator of the vehicle. For example, failure to operate the signaling devices may be interpreted as use of the mobile phone 16 by an operator of the vehicle, while use of the signaling devices may be interpreted as use of the mobile phone by a non-operator of the vehicle.

Moving back to FIG. 3, regardless of how the determination between operator and non-operator is made, if the user is a non-operator of the vehicle (a passenger), then the mobile phone 16 can remain in the operative state, and the communication is allowed as indicated at block 54. However, if the user is an operator of the vehicle (a driver), then the communication may be allowed if the user agrees to an increase in the billing rate for the communication (e.g., a higher cost per minute), as indicated at block 64. For example, the user may be provided with a message indicating that use of the mobile phone 16 while operating the vehicle 10 will incur a higher billing rate. The message may inquire whether or not the user wishes to pay a higher fee for use of the mobile phone 16 while operating the vehicle 10. In response to the message, the user may accept the higher billing rate via keypad entry or voice command, for example. If the user accepts the higher billing rate, then at block 66 the user is charged a premium for the time in which the mobile phone 16 is used while operating the moving vehicle 10, and at block 54, the communication is allowed. If the user does not accept the higher billing rate, then at block 68 operation of the mobile phone is inhibited.

Referring now to FIG. 6A, there is provided a flow chart 80 showing exemplary steps for determining a velocity of a mobile phone 16 based on a Doppler shift of signals 18 transmitted between the mobile phone 16 and the tower 12. In establishing a communication link, signals 18 are exchanged between the tower 12 and the mobile phone 16. As indicated at block 82, the signal frequency transmitted by the tower 12 is at a predetermined frequency, such as 10 MHz, for example. Due to motion of the mobile phone 16 relative to the tower 12, a Doppler shift is introduced, and the frequency of the signal 18a as perceived by the mobile phone 16 is different from the transmitted frequency, as indicated at block 84. At block 86, the mobile phone 16, using conventional techniques, receives the signal 18a and locks on to the Doppler shifted frequency, which is different from the transmitted frequency at the tower 12. For example, if the signal 18a is transmitted from the tower 12 at 10 MHz, and the mobile phone 16 is traveling away from the tower 12, the mobile phone 16 will see and lock onto the signal 18a at a frequency less than 10 MHz (e.g., 9.9 MHz). If the mobile phone is traveling toward the tower 12, then the mobile phone 16 will see and lock onto the signal 18a at a frequency greater than 10 MHz (e.g., 10.1 MHz). The exact frequency depends on the velocity of the mobile phone 16 relative to the tower 12.

In addition to receiving signals from the tower 12, the mobile phone 16 also transmits signals to the tower 12. As the mobile phone 16 transmits a signal 18b to the tower 12, the signal 18b is transmitted at a frequency that corresponds to the Doppler shift detected in the signal 18a, as indicated at block 88. For example, if the signal 18a was transmitted at 10 MHz and detected by the mobile phone 16 at 9.9 MHz, then when the mobile phone 16 transmits signal 18b to the tower 12, the signal 18b will be transmitted at 9.9 MHz.

As the signal is transmitted back to the tower 12 by the moving phone 16, the signal 18b from the point of view of the tower 12 also undergoes a Doppler shift, as indicated at block 90. For example, and as noted above, the signal 18b transmitted by the mobile phone 16 will be at a frequency corresponding to the detected frequency of the signal 18a (e.g., it is transmitted at 9.9 MHz). Due to the motion of the phone 16 relative to the tower 12, the tower 12 will detect the signal with an additional Doppler shift, causing the detected signal 18b to appear even lower in frequency (e.g., 9.8 MHz), as indicated at block 92. Using conventional techniques, the data corresponding to the Doppler shift can be used to calculate a velocity of the mobile phone 16, as indicated at block 94. The calculation may be performed by the network 14, or by the mobile phone 16.

Another method of determining the velocity of the mobile phone 16 based on a characteristic of the wireless signal 18 includes monitoring the timing advance of the burst from a GSM (global system for mobile communication) tower. The term "timing advance" in GSM corresponds to a step change in an approximation of the number of microseconds the signal 18 requires to travel from the mobile phone 16 to the tower 12 or vice versa. GSM uses TDMA (time division multiple access) technology in the radio interface to share a single frequency between several users (e.g., eight users), wherein each user of the several users is assigned sequential timeslots. Each user transmits periodically for less than one-eighth of the time, within one of the eight timeslots. Since the users are various distances from the tower 12 and radio waves travel at the finite speed of light, the precise time at which the phone 16 is allowed to transmit and/or receive a burst of traffic within a timeslot is adjusted accordingly. Timing Advance (TA) is the variable controlling this adjustment.

As the mobile phone 16 moves relative to the tower 12, the timing advance may increase or decrease so as to ensure that communications are optimum. By detecting the amount of timing advance present in the signal 18, the velocity of the mobile phone 16 relative to the tower 12 can be calculated.

Referring now to FIG. 6B, a flow chart 100 illustrating exemplary steps for determining a velocity of the mobile phone 16 in accordance with another embodiment of the invention is provided. Beginning at block 102, the mobile phone 16 monitors signals 18 from the tower 12 as well as signals from neighboring towers 12. For example, in an effort to obtain the best possible signal, the mobile phone 16 may scan signals from neighboring towers 12 to determine if a better quality signal is available. In scanning the neighboring towers, the mobile phone 16 determines the frequency of the signal 18 received from each tower, as indicated at block 104. Each of the scanned signals, however, may be skewed or shifted (Doppler shift) from their frequency as transmitted by the respective tower. At block 106, an average frequency is calculated based on the signal frequencies detected from the tower 12 and neighboring towers 12 (e.g., the frequencies are summed and then divided by the total). At block 108, a threshold is set for detecting when the Doppler shift is sufficiently large so as to infer the mobile phone is moving in a vehicle. In other words, the threshold (Doppler shift) for detecting vehicle motion is set so as to prevent movement of the mobile phone 16 due to walking or running by the operator as being interpreted as vehicle motion.

At step 110, the detected frequencies from each tower (current tower and neighboring towers) are compared to the average frequency as determined at block 106. From this comparison, multiple Doppler shifts can be inferred. If signals from a predetermined number of towers exhibit a Doppler shift greater than the threshold level set at block 108, then it may be concluded that the mobile phone is in a moving vehicle. Further, the accuracy of the estimated velocity may be improved by performing an RMS calculation using the Doppler components obtained from each tower. Performing an RMS calculation on the Doppler components removes the problems associated with some Doppler components being positive values and other Doppler components being negative values.

Moving now to FIG. 7, a flow chart 120 is provided showing exemplary steps for logging data relating to operation of a mobile phone 16 in a vehicle 10. The method of FIG. 7 can be useful, for example, when a contractual relationship exists between the vehicle owner and a third party. The contractual relationship may be in the form of an automobile insurance policy, for example, wherein insurance rates are set or altered based on certain driving habits of the vehicle owner. These safety considerations may include, for example, the amount of time the vehicle operator uses the mobile phone while driving the vehicle.

Beginning at block 122, it is determined whether or not a mobile phone 16 is in use within the vehicle 10. This determination can be made by a telematics system 36 of the vehicle and/or NFC sensors 22 as discussed herein, or via a separate receiver within the passenger compartment that monitors localized energy levels in a cellular uplink band. Further, the detection can include detection of both the operator of the vehicle (driver) and/or a non-operator of the vehicle (a passenger). If use of the mobile phone is detected within the vehicle, then the method loops at block 122. However, if use of the mobile phone 16 is detected in the vehicle 10, then at block 124 the telematics system 36, in addition to phone usage data, logs vehicle parameters, such as speed, acceleration, deceleration, use of turn signals, g-forces, or any other parameter that may be used to determine safe or unsafe driving conditions. The data may be stored in memory of the telematics system 36, such as non-volatile RAM or the like.

At block 126, the telematics system 36 periodically transmits the logged data to a third party, such as an insurance carrier of the vehicle 10. The data then can be analyzed to determine if the driver practices safe driving habits. By monitoring the vehicle operator's driving habits, particularly mobile phone usage, insurance rates can be increased or decreased based on predefined criteria. The threat of an increase in insurance premiums may encourage the operator to minimize or eliminate mobile phone usage while operating the vehicle.

Figure 8:
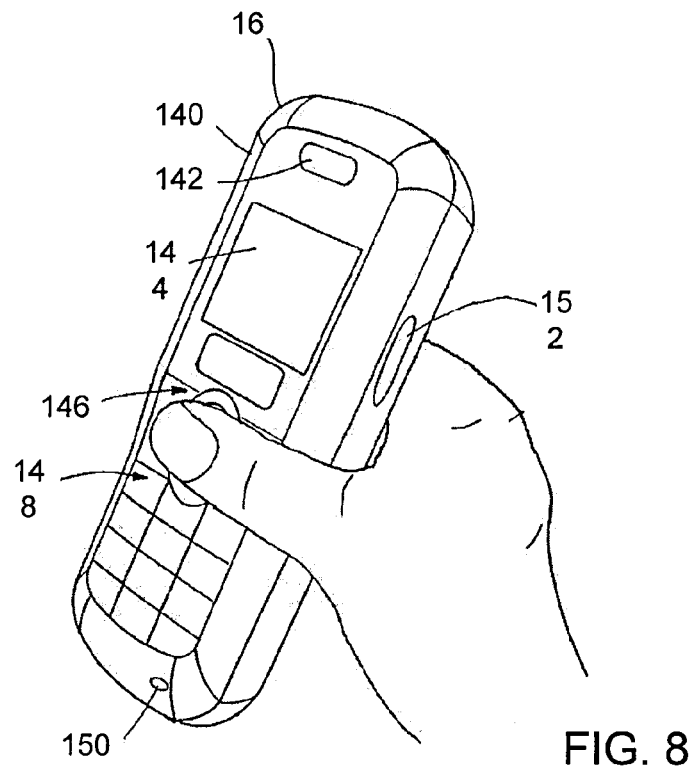
FIG. 8 is schematic illustration of an exemplary mobile phone.

Referring now to FIG. 8, an exemplary portable mobile phone 16 is shown that may be used in accordance with the invention. The mobile phone 16 has a "brick" or "block" design type housing 140, but it will be appreciated that other type housings, such as, for example, claim shell or slide-type housings, may be utilized without departing from the scope of the invention. The mobile phone 16 includes housing 140 (sometimes referred to as a case), speaker 142, display 144, navigation switch and selection/function keys or switches 146, key pad 148, microphone 150, and volume control slide switch 152; these are illustrative and exemplary of parts of a typical mobile phone, but it will be appreciated that other parts that are similar or different in form and/or function may be included in the mobile phone 16. The mobile phones to which the invention pertains also may be of the types that have more or fewer functions, keys, etc., compared to those illustrated and described herein.

Figure 9:
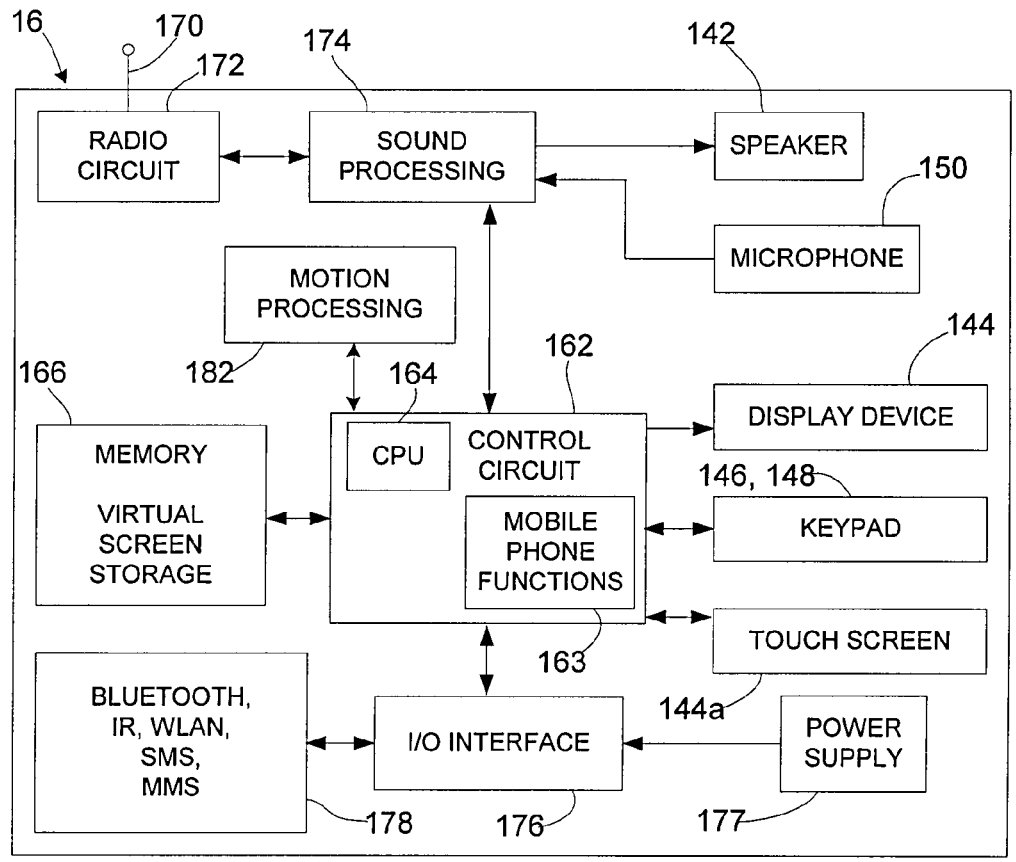
FIG. 9 is a schematic block diagram of a number of exemplary relevant portions of the respective mobile phone of FIG. 8 in accordance with the present invention.

As will be appreciated, the mobile phone 16 may function as a conventional mobile phone. The mobile phone 16 may have additional functions and capabilities that may be developed in the future. From a conventional point of view, the display 144 displays information to a user, such as operating state, time, phone numbers, contact information, various navigational menus, etc., which facilitate and/or enable the user to utilize the various features of the mobile phone. The display also may be used to view movies, images, or to play games, for example. Part or all of the display 144 may be a touch screen type device 144a (FIG. 9). The navigation and function keys 146 and the keypad 148 may be conventional in that they provide for a variety of user operations. For example, one or more of the function keys and navigation device 146 may be used to navigate through a menu displayed on the display 144 to select different phone functions, profiles, settings, etc., as is conventional. The keypad 148 typically includes one or more special function keys, such as, a "call send" key for initiating or answering a call, a "call end" key for ending or hanging up a call, and dialing keys for dialing a telephone number. Other keys included in the navigation and function keys 146 and/or keypad 148 may include an on/off power key, a web browser launch key, a camera key, a voice mail key, a calendar key, etc. The volume control switch 152 may be operated to increase or to decrease the volume of the sound output from the speaker 142. If desired, a sensitivity control also may be provided to change the sensitivity of the microphone 150 as it picks up sounds for transmission by the mobile phone 16. The mobile phone 16 may have more of fewer keys, navigation devices, etc., compared to those illustrated.

FIG. 9 represents a functional block diagram of an exemplary mobile phone, for example, the mobile phone 16. The representation also is similar to those of PDAs, non-portable phones (e.g., telematic systems of a vehicle) and/or other electronic equipment, as will be appreciated by those having ordinary skill in the art. The various functions carried out by the parts represented in the functional block diagram of FIG. 9 may be carried out by application software within the mobile phone 16. However, it will be apparent to those having ordinary skill in the art that such operation can be carried out via primarily software, hardware, firmware, or a combination thereof, without departing from the scope of the invention.

The mobile phone 16 includes a primary control circuit 162 that is configured to carry out overall control of the functions and operations of the mobile phone 16, e.g., as is represented at block 163. The control circuit 162 may include a CPU 164 (central processor unit), microcontroller, microprocessor, etc., collectively referred to herein simply as CPU 164. The CPU 164 executes code stored in memory within the control circuit 162 (not shown) and/or in a separate memory 166 in order to carry out conventional operation of the mobile phone functions within the mobile phone 16. In addition, the CPU 164 executes code stored in the memory 166, for example, or in some other memory (not shown) in order to perform the various functions of detecting motion based on signals provided by the motion transducer 160 and to alter the display data based on the detected motion.

Continuing to refer to FIG. 9, the mobile phone 9 includes a conventional antenna 170, radio circuit 172, and sound processing signal circuit 174, all of which are cooperative to send and to receive radio frequency (or other) signals in conventional manner. For an incoming signal, for example, the sound processing signal circuit 174 may include an amplifier to amplify the signal and to provide it to the speaker 142 so a user may hear the sound, and the sound processing signal circuit 174 also may use the same amplifier or another amplifier to amplify signals from the microphone 150 for transmitting thereof via the radio circuit 172 and antenna 170 to another mobile telephone, to a cellular phone tower, to a satellite, etc. Operation of the radio circuit 172, sound processing signal circuit 174, speaker and microphone, are under control of the control circuit 172, as is conventional.

The mobile phone 16 includes the display device 144, keypad 146, 148 (including the navigation device mentioned above), and the capability of a touch screen 144a, which may be part or all of the display device 144, and these are coupled to the control circuit 162 for operation as is conventional.

As is illustrated in FIG. 9, the mobile phone 16 includes an input/output interface 176, a power supply 177, and a short distance communications mechanism 178, for example a Bluetooth communications device, infrared (IR) communications device, or some other device. Another example of a short distance communications mechanism is wireless local area network (WLAN), and the invention also may use still other short distance communications mechanisms or devices that currently exist or may be developed in the future. The short distance communications mechanism 178 may transmit and receive signals using SMS (short message service), MMS (multimedia messaging service) or some other communications mechanism and protocol. Bluetooth, IR, WLAN communications for communicating over short distances between mobile phones are well known; other mechanisms may exist and/or may be developed in the future, and these may be utilized by and are included for use in the invention.

A motion processing circuit 182 determines a velocity of the mobile phone based on a characteristic of a wireless signal used by the mobile phone. More specifically, and as discussed herein, the motion processing circuit 182 can determine a Doppler shift in a wireless signal used by the mobile phone 16. The Doppler shift then is used to calculate a velocity of the phone. Based on the velocity, the mobile phone may be enabled or disabled as discussed herein.

A person having ordinary skill in the art of computer programming and applications of programming for mobile phones would be able in view of the description provided herein to program a mobile phone 16 to operate and to carry out the functions described herein. Accordingly, details as to the specific programming code have been omitted for the sake of brevity. Also, while software in the memory 166 or in some other memory of the mobile phone 16 may be used to allow the mobile phone to carry out the functions and features described herein in accordance with the preferred embodiment of the invention, such functions and features also could be carried out via dedicated hardware, firmware, software, or combinations thereof, without departing from the scope of the invention.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of operating electronic equipment, wherein said electronic equipment utilizes a wireless signal to communicate, comprising: determining if the electronic equipment is operated within a moving vehicle based on a characteristic of the wireless signal; determining if a user of the electronic equipment is an operator or non-operator of the moving vehicle, wherein it is concluded that the user is a non-operator of the moving vehicle when
    a plurality of electronic equipment within a predefined area have wireless signals exhibiting substantially the same characteristics,
        and inhibiting operation of the electronic equipment if the electronic equipment is in a moving vehicle and the user of the electronic equipment is an operator of the moving vehicle, and enabling operation of the electronic equipment if the user is a non-operator of the moving vehicle.

2. The method of claim 1, wherein the characteristic of the wireless signal is a timing advance or a Doppler shift of the wireless signal.

3. The method of claim 1, wherein determining if a user of the electronic equipment is an operator or a non-operator includes using a near field device located at non-operator seating locations to enable operation of the electronic equipment while the vehicle is moving.

4. The method of claim 1, further comprising overriding the inhibiting step by user operation of at least one user signal device at a periodic time interval.

5. The method of claim 4, wherein the user signal device is at least one of a keypad of the electronic equipment or at least one button located near non-operator seating locations.

6. The method of claim 4, wherein operation of the user signal device is in response to a prompt generated in on or in the electronic equipment.

7. The method of claim 6, wherein the prompt comprises a code periodically displayed on a display device of the electronic equipment, and operation of the user signal device comprises re-entry of the code on a keypad of the electronic equipment.

8. A method of operating electronic equipment, wherein said electronic equipment utilizes a wireless signal to communicate, comprising:
    determining if the electronic equipment is operated within a moving vehicle based on a characteristic of the wireless signal;
    determining if a user of the electronic equipment is an operator or a non-operator of the moving vehicle, wherein determining if the user is an operator or non-operator includes
        detecting Doppler shifts for a plurality of electronic equipment within a predefined area;
        determining that said user is a non-operator of the moving vehicle when a plurality of electronic equipment in the same predefined area have substantially the same Doppler shift; and
    inhibiting operation of the electronic equipment if the electronic equipment is in a moving vehicle and the user of the electronic equipment is an operator of the moving vehicle.

9. The method of claim 1, further comprising enabling all emergency communications.

10. The method of claim 1, further comprising implementing a differential charge for use of the electronic equipment, said differential charge including a first rate and a second rate greater than the first rate, and wherein inhibiting operation includes allowing use of the electronic equipment only at the second rate if said user is an operator of the moving vehicle.

11. The method of claim 1, wherein determining if the electronic equipment is operated in a moving vehicle includes using the electronic equipment to determine a Doppler shift in the wireless signal and to inhibit operation of the electronic equipment.

12. The method of claim 1, wherein determining if the electronic equipment is operated in a moving vehicle includes using a wireless network to determine a Doppler shift in the wireless signal and to inhibit operation of the electronic equipment.

13. The method of claim 1, wherein the electronic equipment is a mobile phone.

14. An electronic equipment, comprising: a motion processing circuit operable to
   a) determine a velocity of the electronic equipment based on a characteristic of a wireless signal used by the electronic equipment, and
   b) determine if a user of the electronic equipment is an operator or non- operator of the moving vehicle, wherein it is concluded that the user is a non- operator of the moving vehicle when a plurality of electronic equipment within a predefined area have wireless signals exhibiting substantially the same characteristics, and a control circuit configured to interrupt operation of the electronic equipment when said velocity corresponds to operation of the mobile phone in a moving vehicle and the user of the electronic equipment is an operator of the moving vehicle, and enable operation of the electronic equipment if the user is a non-operator of the moving vehicle.

15. The electronic equipment of claim 14, wherein the characteristic of the wireless signal is a timing advance or a Doppler shift of the wireless signal.

\* \* \* \* \*